(12) United States Patent
Hagiwara et al.

(10) Patent No.: US 7,310,083 B2
(45) Date of Patent: Dec. 18, 2007

(54) COORDINATE INPUT DEVICE

(75) Inventors: Yasuji Hagiwara, Fukushima-ken (JP); Masahiro Soma, Fukushima-ken (JP); Masahiro Takata, Fukushima-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 540 days.

(21) Appl. No.: 10/896,595

(22) Filed: Jul. 22, 2004

(65) Prior Publication Data

US 2005/0024327 A1    Feb. 3, 2005

(30) Foreign Application Priority Data

Jul. 28, 2003    (JP)    ............................. 2003-202501

(51) Int. Cl.
*G09G 5/00*    (2006.01)

(52) U.S. Cl. ........................ 345/156; 200/5 R; 345/172

(58) Field of Classification Search ................ 345/156, 345/157, 184, 161, 172; 200/5 R, 5 A, 5 B, 200/5 C, 5 EB; 74/470, 471
See application file for complete search history.

(56) References Cited

U.S. PATENT DOCUMENTS 4,273,972 A    6/1981    Butterworth 5,790,097 A    8/1998    Oder
6,181,327 B1   1/2001    Lin et al.
6,198,472 B1   3/2001    Lection et al.
6,528,740 B2 * 3/2003    Miyoshi ..................... 200/5 R

FOREIGN PATENT DOCUMENTS

DE    38 30 933    10/1989
JP    2003-84916   3/2003

* cited by examiner

*Primary Examiner*—Amr A. Awad
*Assistant Examiner*—Dennis P Joseph
(74) *Attorney, Agent, or Firm*—Brinks Hofer Gilson & Lione (57) ABSTRACT

A coordinate input device includes a housing containing a movable member, a resilient member formed of a coil spring, and first and second detectors for detecting the sliding direction and the sliding distance of the movable member. The movable member in an initial position before a sliding operation faces a supporter of a first cover provided in the housing. When the movable member is slid in a certain direction, the resilient member is stretched in the certain direction and the first and second detectors detect the sliding direction and the sliding distance of the movable member. When the sliding operation of the movable member is finished, a resilient force of the resilient member stretched in the certain direction forces the movable member to return automatically to the initial position.

6 Claims, 7 Drawing Sheets

COORDINATE INPUT DEVICE

This application claims the benefit of priority to Japanese Patent Application No. 2003-202501, herein incorporated by reference.

BACKGROUND OF THE INVENTION

1. Field of the Invention

The present invention relates to coordinate input devices, and particularly, to a coordinate input device which allows desired input by sliding an operating part and which is suitable for, for example, personal computers, mobile phones, and video game units.

2. Description of the Related Art

Figure 13:
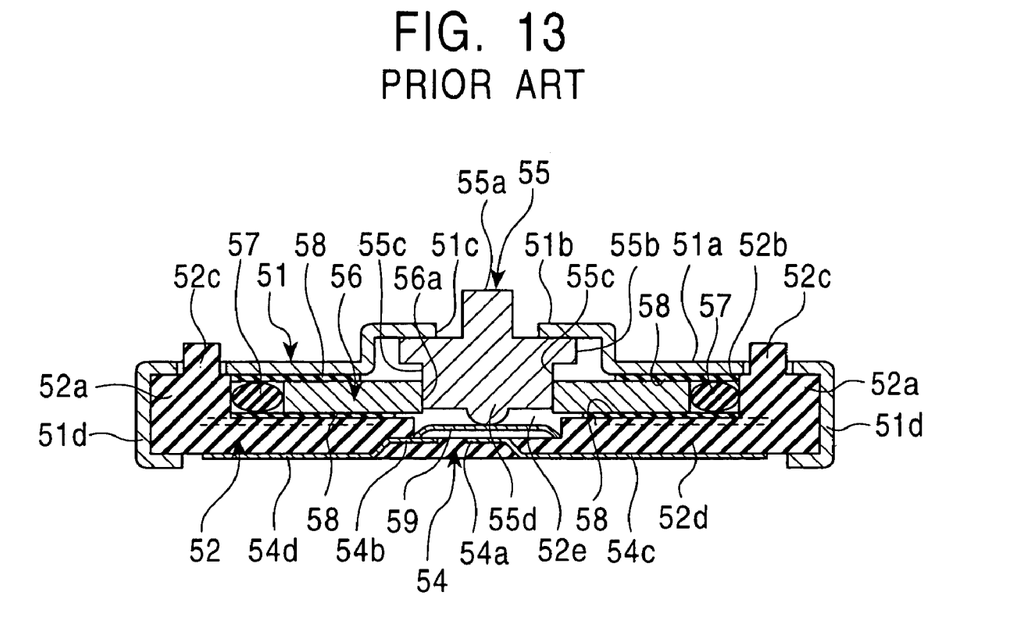
FIG. 13 is a cross-sectional view illustrating a relevant section of a conventional coordinate input device.
Figure 14:
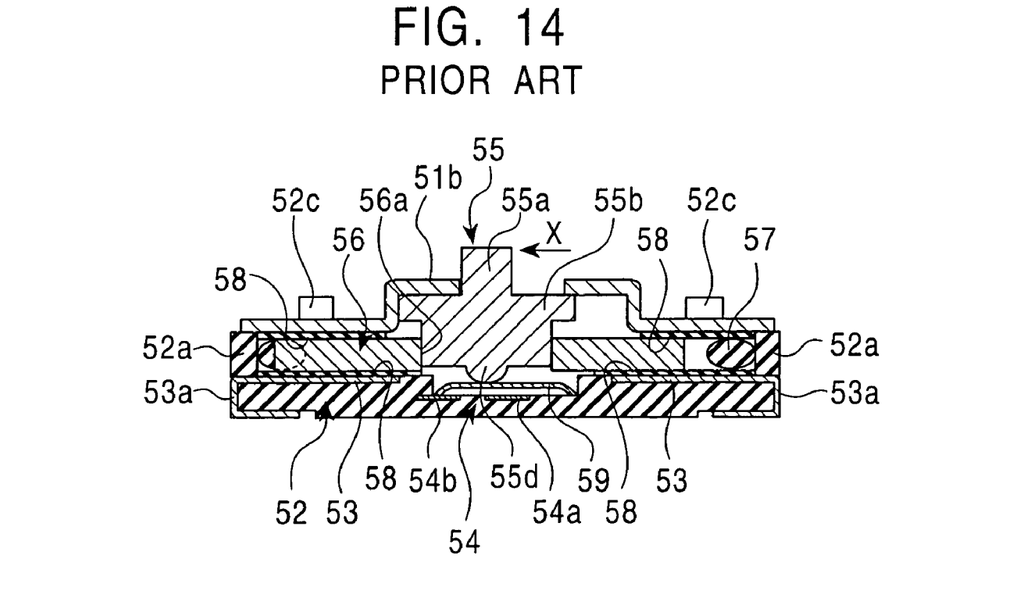
FIG. 14 is cross-sectional view illustrating the operation of the conventional coordinate input device in FIG. 13.

FIGS. 13 and 14 illustrate a conventional coordinate input device which can be operated by sliding an operating part to perform a desired input operation. Such a conventional coordinate input device is disclosed in Japanese Unexamined Patent Application Publication No. 2003-84916. The coordinate input device includes an upper casing 51 at the top portion of the device, and an insulative lower casing 52 which faces the upper casing 51 and is disposed below the upper casing 51.

The upper casing 51 is provided with a flat electrode section 51a, a shaft guide 51b, and a circular operation hole 51c. Specifically, the electrode section 51a extends around the outer periphery of the upper casing 51, and the shaft guide 51b protrudes from the central portion of the electrode section 51a. The circular operation hole 51c extends through the center of the shaft guide 51b.

Furthermore, a pair of caulkers 51d extends downward from two corresponding sides of the upper casing 51, i.e. at the left and the right of the drawing.

On the other hand, the lower casing 52 includes a cover 52a around the outer periphery of the lower casing 52, and a cavity 52b surrounded by the cover 52a. The cover 52a of the lower casing 52 is provided with a caulking protrusion 52c for caulking the upper casing 51. The caulking protrusion 52c extends to a predetermined height.

The central portion of a bottom plate 52d forming the cavity 52b is provided with a switch-holding section 52e which extends downward to a predetermined depth.

Furthermore, the bottom plate 52d is provided with a fixed electrode 53 which includes, for example, four equally-divided fan-shaped electrode components, i.e. first to fourth electrode components, in the circumferential direction of the bottom plate 52d.

The fixed electrode 53 further includes reeds 53a which are connected to the corresponding first to fourth electrode components. The reeds 53a extend toward the exterior of the cover 52a.

The bottom surface of the switch-holding section 52e of the lower casing 52 is provided with a switch circuit 54. The switch circuit 54 includes a circular central fixed-contact 54a and a peripheral fixed-contact 54b having, for example, a horseshoe shape and disposed distant from the central fixed-contact 54a.

The central fixed-contact 54a and the peripheral fixed-contact 54b are respectively connected with external terminals 54c and 54d which extend toward the exterior of the bottom plate 52d.

Furthermore, an operating shaft 55 extends through the shaft guide 51b of the upper casing 51. The operating shaft 55 includes an operating part 55a protruding upward and a flanged part 55b.

The operating shaft 55 further includes a supporting part 55c below the flanged part 55b and having a larger diameter than the operating part 55a, and a contact-pressing part 55d protruding downward from the center of the bottom surface of the supporting part 55c.

According to the operating shaft 55, the operating part 55a extends upward through the operation hole 51c of the upper casing 51, and the flanged part 55b is in contact with the inner surface of the shaft guide 51b. Thus, the operating shaft 55 is slidable in any horizontal direction, and moreover, can be pressed vertically.

The cavity 52b contains a toric-shaped movable electrode 56. The central portion of the movable electrode 56 is provided with a supporting hole 56a which engages with the supporting part 55c of the operating shaft 55.

Furthermore, the outer diameter of the movable electrode 56 is smaller than the inner diameter of the cavity 52b, such that a resilient member 57 is disposed in a space between the inner peripheral surface of the cavity 52b and the outer peripheral surface of the movable electrode 56.

The resilient member 57 is an O-shaped ring whose inner diameter is equal to or less than the diameter of the movable electrode 56. The cross section of the resilient member 57 is substantially oval.

Since the resilient member 57 is disposed in the space between the inner peripheral surface of the cavity 52b and the outer peripheral surface of the movable electrode 56, the biasing force of the resilient member 57 allows the movable electrode 56 to be positioned at the center of the cavity 52b.

Moreover, adjacent to each of the top and bottom surfaces of the movable electrode 56, an insulative sheet 58 is provided.

The switch-holding section 52e of the lower casing 52 contains a metallic contact 59 whose central portion is projected upward.

The metallic contact 59 in the switch-holding section 52e is in contact with the tip of the contact-pressing part 55d of the operating shaft 55, and the periphery of the metallic contact 59 is electrically in contact with the peripheral fixed-contact 54b of the switch circuit 54.

Referring to FIG. 14, the operation of such a conventional coordinate input device will now be described. Firstly, the operating shaft 55 is in the initial state. This initial state refers to a neutral state in which the movable electrode 56 and the operating shaft 55 are positioned at the center of the cavity 52b by the resilient force of the resilient member 57.

In the initial state, a controller (not shown in the drawings) is capable of determining the electrostatic capacitance generated between the electrode section 51a of the upper casing 51 and the electrode components of the fixed electrode 53 in the lower casing 52.

For example, when a horizontal force is applied to the operating shaft 55 in the initial state in a direction indicated by an arrow X, the movable electrode 56 slides toward the left of the drawing such that the left portion of the resilient member 57 is compressed and resiliently deformed.

Thus, the electrostatic capacitance between the fixed electrode 53 and the movable electrode 56 at the left side of the drawing increases from the initial value.

At the same time, the electrostatic capacitance between the fixed electrode 53 and the movable electrode 56 at the right side of the drawing decreases from the initial value.

When the controller detects such a change in electrostatic capacitance, a cursor on a display screen of, for example, a mobile phone (not shown in the drawings) can be moved to a desired position at the left side of the display screen.

When the cursor is shifted to the desired position and the operating shaft 55 is pressed vertically, the contact-pressing part 55d of the operating shaft 55 presses against the metallic contact 59.

Thus, the metallic contact 59 becomes resiliently deformed such that the tip of the deformed metallic contact 59 comes into contact with the central fixed-contact 54a. The metallic contact 59 thus electrically connects the central fixed-contact 54a and the peripheral fixed-contact 54b so as to switch the contact of the switch circuit 54.

For example, the switching of the contact of the switch circuit 54 can allow a message, corresponding to the position of the cursor on the display screen, to be opened.

Furthermore, when the horizontal force or the vertical force applied to the operating shaft 55 is released, the resilient force of the resilient member 57 or the resilient force of the metallic contact 59, respectively, forces the operating shaft 55 to return automatically to the neutral position, i.e. the initial state.

Such a conventional coordinate input device, however, is problematic in that the device is large in size. This is due to the fact that, for allowing the operating shaft 55 to slide by a large distance, the thickness, of the resilient member 57, whose cross section is substantially oval, must be made large so that the resilient member 57 can be deformed in cross section.

Moreover, a large operational force is required for sliding the operating shaft 55 so as to cross-sectionally deform the resilient member 57. Otherwise, the movable electrode 56 cannot be slid properly.

Consequently, this may cause problems for, for example, women and children since they may not be able to slide the operating shaft 55 by a large distance and thus may not be able to perform a desired coordinate input operation.

SUMMARY OF THE INVENTION

Accordingly, it is an object of the present invention to solve the problems mentioned above by providing a compact, coordinate input device having high operationability, in which a coordinate input operation can be performed with a small operational force, and moreover, a large sliding distance is provided.

According to a first aspect of the present invention, a coordinate input device is provided with a housing having a first cover and a second cover which face each other; a movable member which is disposed between the first cover and the second cover and which is slidable along the first cover and the second cover; an endless resilient member; and detectors for detecting a sliding direction and a sliding distance of the movable member, the detectors being disposed inside the housing. One of the first cover and the second cover comprises a supporter for supporting an inner periphery of the resilient member. The movable member in an initial position before a sliding operation is resiliently biased by the resilient member such that the movable member faces the supporter. When the movable member is slid in a certain direction from the initial position, the resilient member is stretched in the certain direction and the detectors detect the sliding direction and the sliding distance of the movable member. When the sliding operation of the movable member is finished, a resilient force of the resilient member stretched in the certain direction forces the movable member to return automatically to the initial position.

Accordingly, a compact, low-profile coordinate input device is provided.

Furthermore, the detectors are preferably slidable variable-resistors and may comprise a first detector for detecting the sliding of the movable member in an x-axis direction, and a second detector for detecting the sliding of the movable member in a y-axis direction. Each of the first detector and the second detector may be provided with an operating shaft, the resistance of each of the first detector and the second detector being changeable by sliding the corresponding operating shaft.

Accordingly, this structure ensures the detection of the sliding direction and the sliding distance of the movable member by the first and second detectors when the movable member is slid in a certain direction.

Moreover, since low-cost commercially-available variable resistors can be used in the device, the overall cost of the device can be reduced.

Furthermore, the resilient member may comprise a coil spring formed of a coiled wire having a predetermined wire diameter. For this reason, the biasing force of the resilient member can be changed easily depending on the intended purpose. Moreover, the biasing force of the resilient member ensures the slid movable member to return automatically to the initial position, thereby achieving a coordinate input device having high operationability.

Furthermore, the movable member may comprise a knob which protrudes outward through the first cover. Moreover, an operating part for sliding the movable member may be mounted on the knob, the operating part being slidable on the top surface of the first cover while being in contact with the top surface. Accordingly, this prevents the movable member from tilting when the operating part is being slid so as to properly achieve a smooth sliding operation of the movable member.

Furthermore, the first detector and the second detector may be disposed in the second cover such that the sliding direction of the operating shaft of the first detector is orthogonal to the sliding direction of the operating shaft of the second detector. Accordingly, this ensures the detection of the sliding direction and the sliding distance of the movable member by the first and second detectors.

Furthermore, the movable member may further comprise a first supporting slit for supporting the operating shaft of the first detector, and a second supporting slit for supporting the operating shaft of the second detector, the first supporting slit extending in the y-axis direction such that the operating shaft of the first detector is slidable in the y-axis direction, the second supporting slit extending in the x-axis direction such that the operating shaft of the second detector is slidable in the x-axis direction. Accordingly, both operating shafts of the first and second detectors can be slid smoothly.

Moreover, the first and second detectors can both be operated by the sliding operation of a single movable member.

Furthermore, the first detector may alternatively be disposed in the second cover and the second detector may alternatively be disposed in the movable member, such that the sliding direction of the operating shaft of the first detector crosses the sliding direction of the operating shaft of the second detector. This structure reduces the total occupied area by the first and second detectors to contribute to a compact coordinate input device.

Furthermore, the operating shaft of the first detector and the operating shaft of the second detector may be coupled together with a coupler such that both operating shafts of the first detector and the second detector are simultaneously operated when the sliding operation of the movable member is performed. Accordingly, the first and second detectors can both be operated by the sliding operation of a single movable member.

Furthermore, one of the first cover and the second cover may comprise a switch circuit, a contact of the switch circuit being switched on and off by pressing the movable member. Accordingly, in addition to the detection of the sliding direction and the sliding distance of the movable member by the first and second detectors, the switching of the contact of the switch circuit can be performed. This achieves a more versatile coordinate input device.

According to a second aspect of the present invention, a coordinate input device is provided with a housing having a first cover and a second cover which face each other; a movable member which is disposed between the first cover and the second cover and which is slidable along the first cover and the second cover; an endless resilient member disposed around an outer periphery of the movable member; a supporting member which faces the movable member and supports an inner periphery of the resilient member; and a detector including an operating shaft and a plurality of distortion sensors, the operating shaft supporting the supporting member. The movable member in an initial position before a sliding operation is resiliently biased by the resilient member such that the movable member faces the supporting member. When the movable member is slid in a certain direction from the initial position, the resilient member is stretched in the certain direction and a deflecting force is thus applied to the operating shaft via the supporting member, the distortion sensors detecting the deflection of the operating shaft so as to determine a sliding direction and a sliding distance of the movable member. When the sliding operation of the movable member is finished, a resilient force of the stretched resilient member forces the movable member to return automatically to the initial position.

Accordingly, this structure requires a less number of components since the sliding direction and the sliding distance of the movable member can be detected by a single detector.

Furthermore, according to the second aspect, the resilient member may comprise a coil spring formed of a coiled wire having a predetermined wire diameter.

Furthermore, according to the second aspect, one of the first cover and the second cover may comprise a switch circuit, a contact of the switch circuit being switched on and off by pressing the movable member.

DESCRIPTION OF THE PREFERRED EMBODIMENTS

Figure 1:
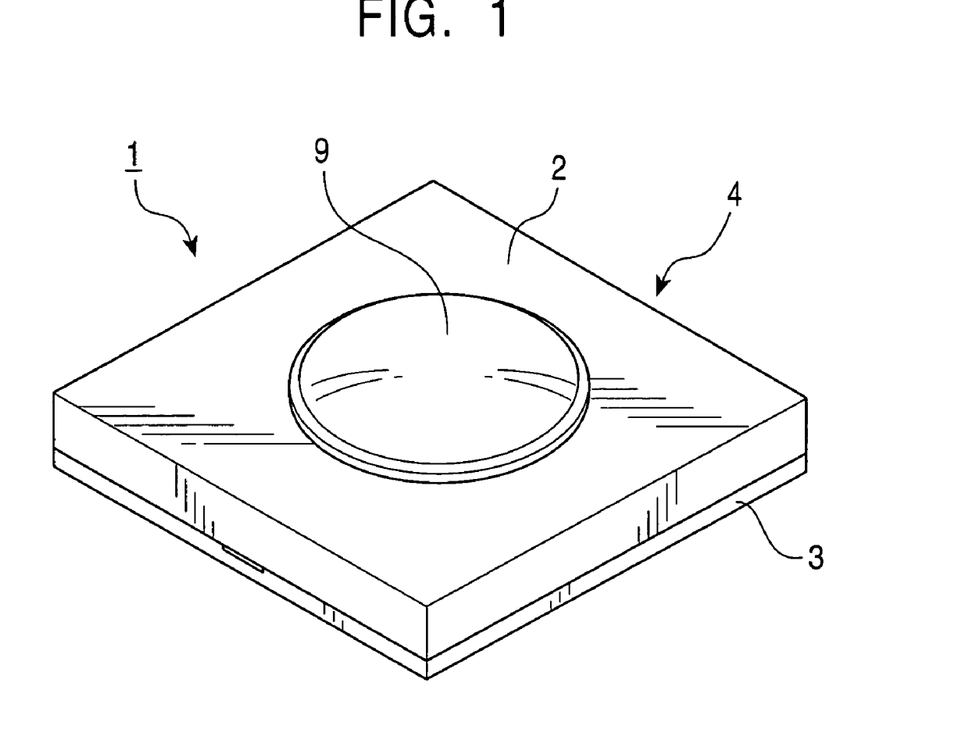
FIG. 1 is a perspective view of a coordinate input device according to the present invention.
Figure 2:
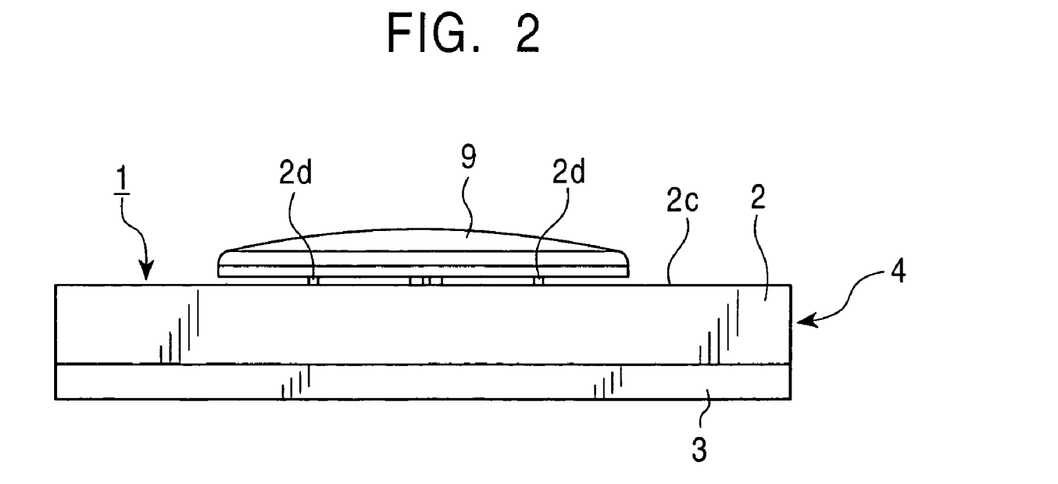
FIG. 2 is a side view of FIG. 1.
Figure 3:
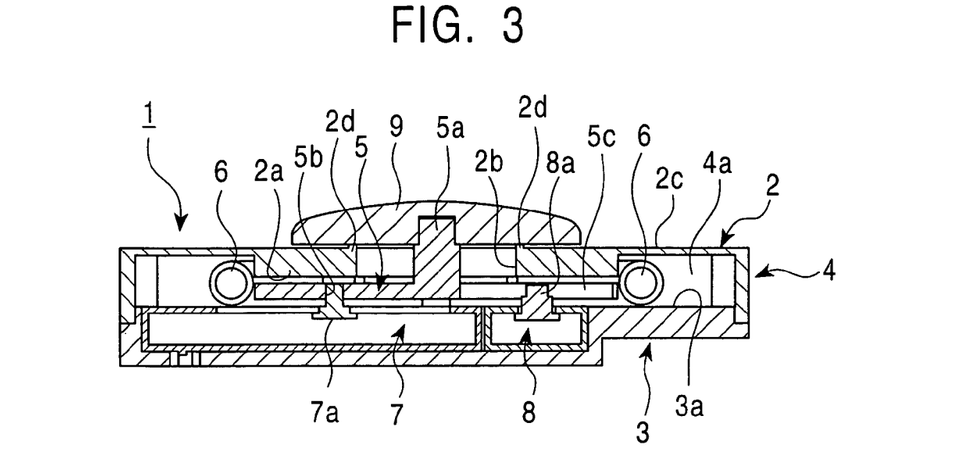
FIG. 3 is a cross-sectional view illustrating a relevant section of the coordinate input device according to a first embodiment of the present invention.
Figure 4:
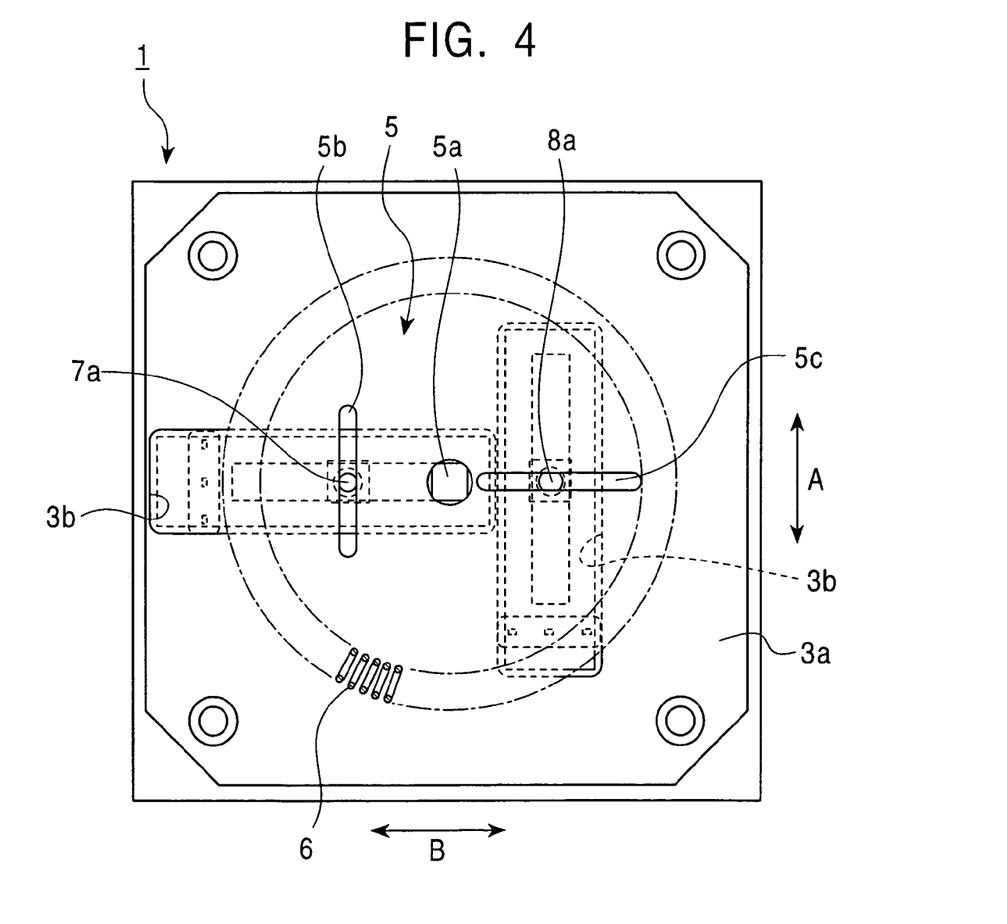
FIG. 4 is a plan view illustrating a relevant section of FIG. 3.
Figure 5:
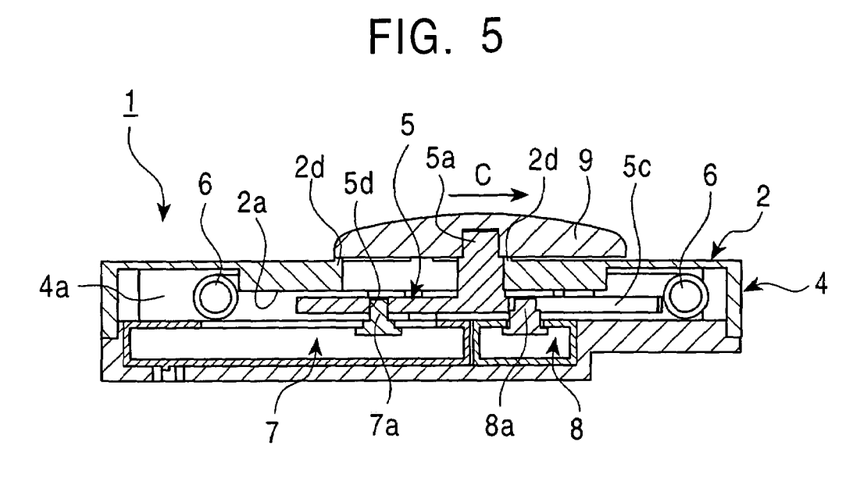
FIG. 5 is a cross-sectional view illustrating the operation of the coordinate input device in FIG. 3.
Figure 6:
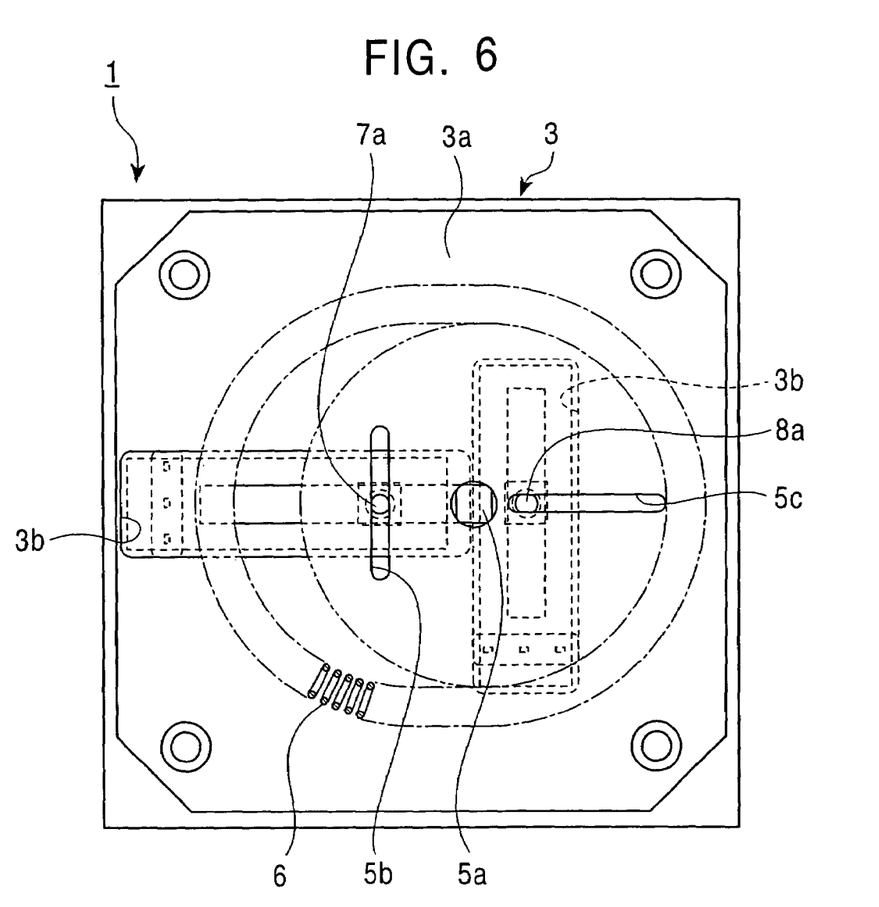
FIG. 6 is a plan view illustrating a relevant section of FIG. 5.
Figure 7:
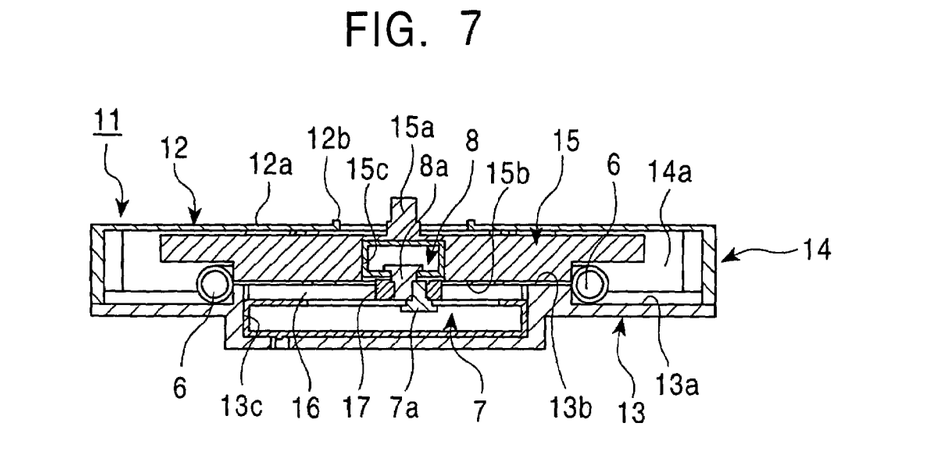
FIG. 7 is a cross-sectional view illustrating a relevant section of a coordinate input device according to a second embodiment of the present invention.
Figure 8:
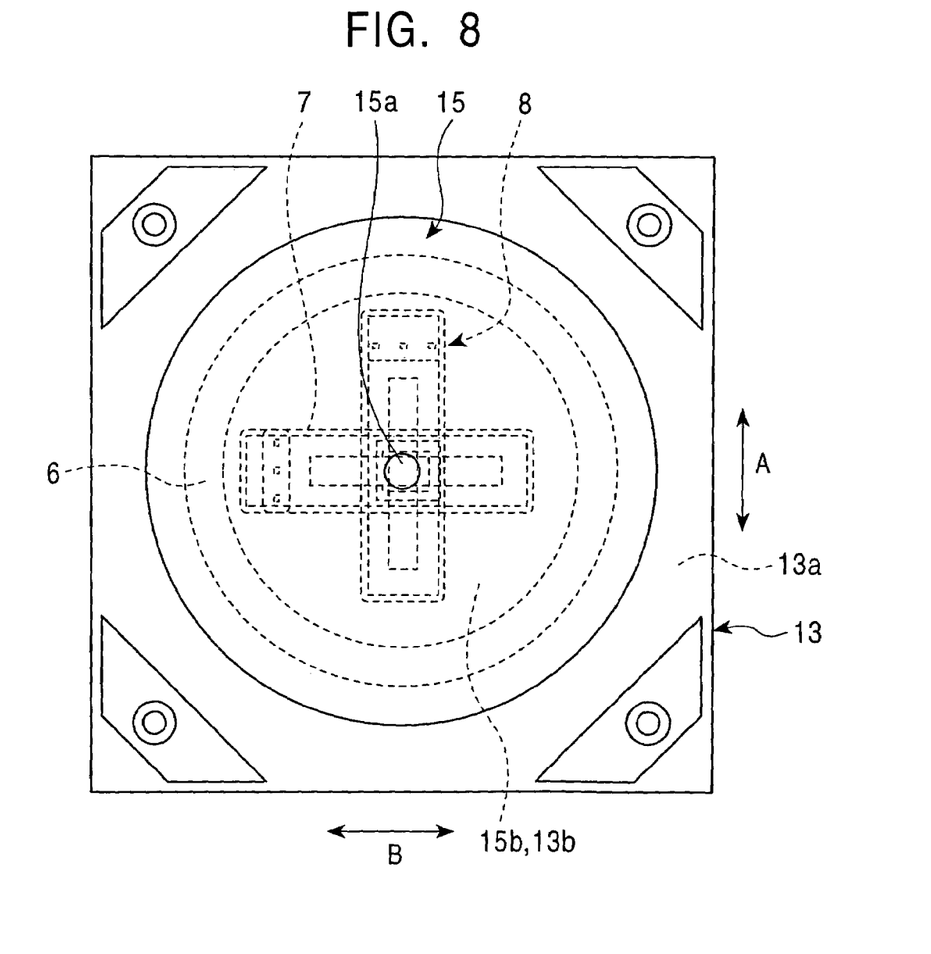
FIG. 8 is a plan view illustrating a relevant section of FIG. 7.
Figure 9:
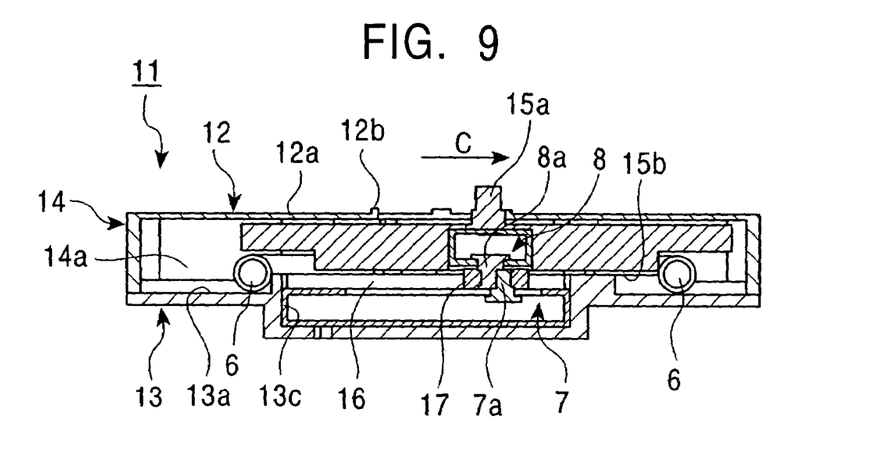
FIG. 9 is a cross-sectional view illustrating the operation of the coordinate input device in FIG. 7.
Figure 10:
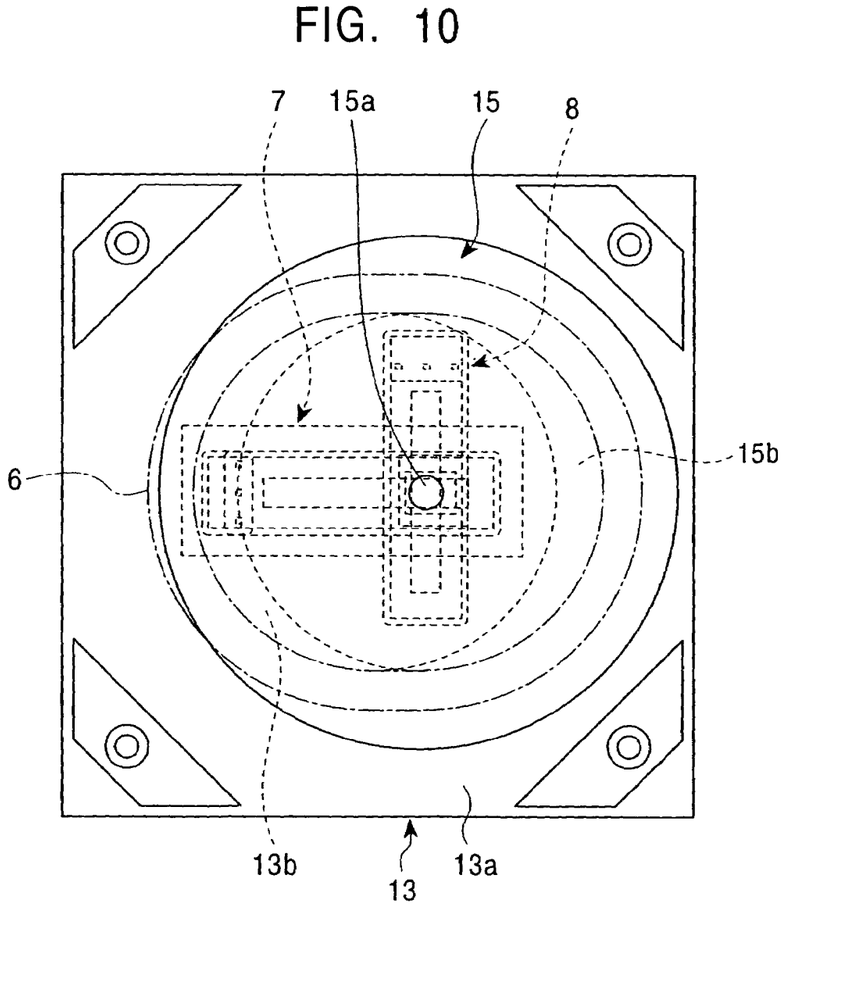
FIG. 10 is a plan view illustrating a relevant section of FIG. 9.
Figure 11:
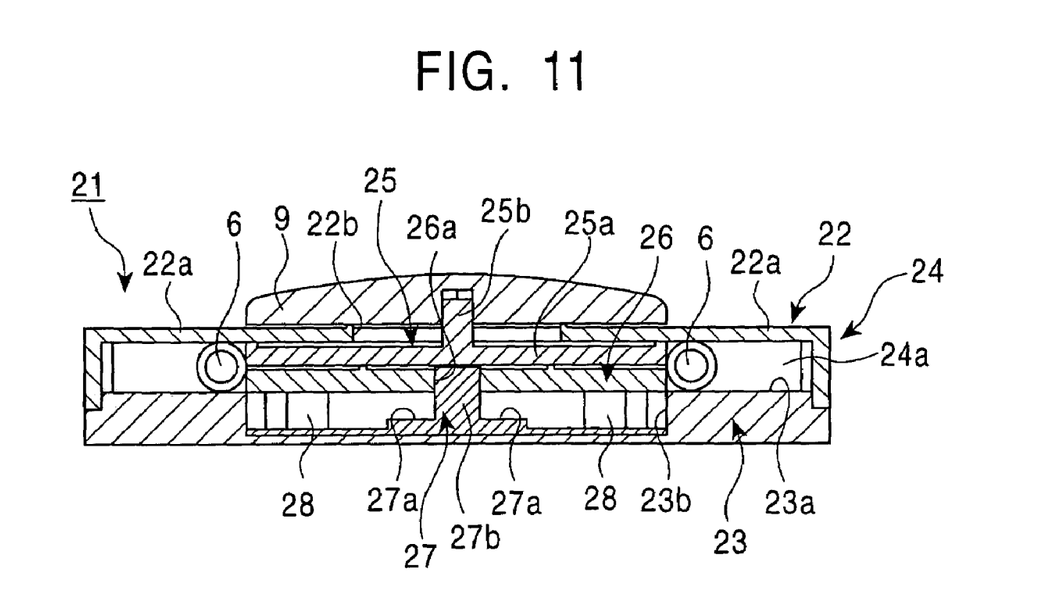
FIG. 11 is a cross-sectional view illustrating a relevant section of a coordinate input device according to a third embodiment of the present invention.
Figure 12:
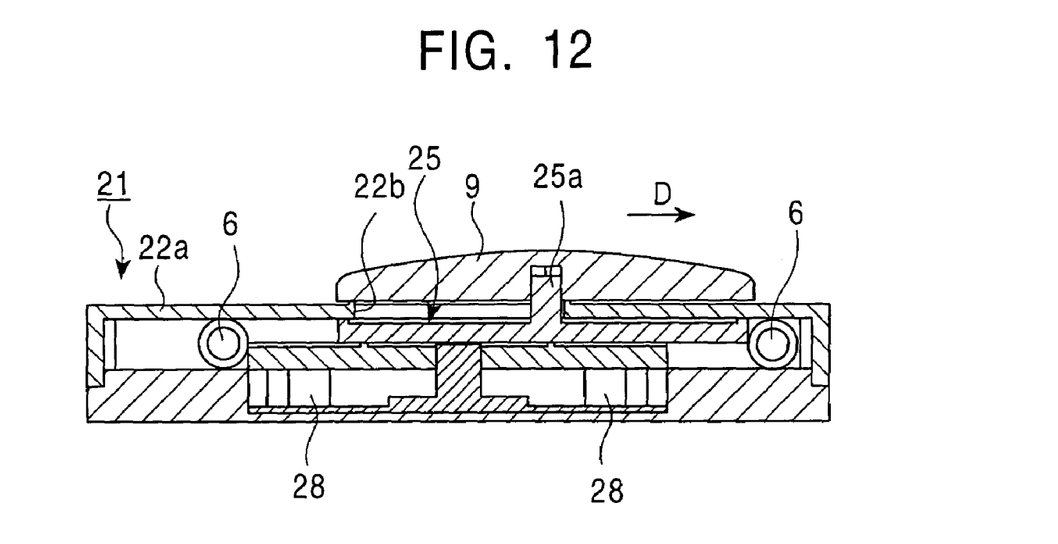
FIG. 12 is a cross-sectional view illustrating the operation of the coordinate input device in FIG. 11.

FIG. 1 is a perspective view of a coordinate input device 1 of the present invention. FIG. 2 is a side view of FIG. 1. FIG. 3 is a cross-sectional view illustrating a relevant section of the coordinate input device 1 according to a first embodiment of the present invention. FIG. 4 is a plan view illustrating a relevant section of FIG. 3. FIG. 5 is a cross-sectional view illustrating the operation of the coordinate input device 1 in FIG. 3. FIG. 6 is a plan view illustrating a relevant section of FIG. 5. FIG. 7 is a cross-sectional view illustrating a relevant section of a coordinate input device 11 according to a second embodiment of the present invention. FIG. 8 is a plan view illustrating a relevant section of FIG. 7. FIG. 9 is a cross-sectional view illustrating the operation of the coordinate input device 11 in FIG. 7. FIG. 10 is a plan view illustrating a relevant section of FIG. 9. FIG. 11 is a cross-sectional view illustrating a relevant section of a coordinate input device 21 according to a third embodiment of the present invention. FIG. 12 is a cross-sectional view illustrating the operation of the coordinate input device 21 in FIG. 11.

First Embodiment

The coordinate input device 1 according to the first embodiment of the present invention will now be described with reference to FIGS. 1 to 8.

Referring to FIGS. 1 and 2, the coordinate input device 1 according to the first embodiment of the present invention is provided with a housing 4 whose profile is substantially rectangular. The housing 4 includes a first cover 2 and a second cover 3 which face each other.

Referring to FIG. 3, the first cover 2 has a circular supporter 2a protruding downward towards the interior of the first cover 2 to a predetermined height. The central portion of the supporter 2a is provided with an opening 2b having predetermined dimensions. On the other hand, referring to FIG. 4, the second cover 3 has an inner surface 3a provided with a T-shaped recess 3b in which a first detector 7 and a second detector 8, which will be described later, are embedded.

Furthermore, referring to FIG. 3, the first cover 2 and the second cover 3 have a cavity 4a therebetween.

A circular-plate movable member 5 having a predetermined thickness is disposed in the cavity 4a such that the movable member 5 has the same diameter as the circular supporter 2a and faces the supporter 2a.

The central portion of the movable member 5 is provided with a knob 5a which protrudes upward through the opening 2b of the first cover 2 to a predetermined height. Referring to FIG. 3, the movable member 5 having the knob 5a positioned within the opening 2b is capable of sliding along the first and second covers 2 and 3 in any direction within the cavity 4a.

Furthermore, referring to FIG. 4, the movable member 5 is provided with a first supporting slit 5b at the left side of the knob 5a. The first supporting slit 5b extends in the y-axis direction indicated by an arrow A. Moreover, the movable member 5 is also provided with a second supporting slit 5c at the right side of the knob 5a. The second supporting slit 5c extends in the x-axis direction indicated by an arrow B. Thus, the first supporting slit 5b and the second supporting slit 5c are orthogonal to each other and have the knob 5a therebetween.

Furthermore, a resilient member 6 is disposed around the outer circumference of the supporter 2a such that the inner periphery of the resilient member 6 is supported by the outer periphery of the supporter 2a. Specifically, the resilient member 6 is a coil spring formed by winding a wire having a predetermined wire diameter into a coil. The resilient member 6 is endless since its two tips are connected together.

When the movable member 5 is in its initial state, i.e. before the sliding operation, the outer periphery of the movable member 5 is resiliently biased against the resilient member 6 such that the movable member 5 is aligned with the supporter 2a.

Furthermore, as mentioned previously, the first detector 7 and the second detector 8 are disposed in the surface of the second cover 3 facing the movable member 5. The first detector 7 and the second detector 8 detect the sliding direction and the sliding distance of the movable member 5.

In detail, the first detector 7 and the second detector 8 are known slidable variable-resistors and have operating shafts 7a and 8a, respectively. The first detector 7 and the second detector 8 operate based on sliding of the respective operating shafts 7a and 8a such that the resistance is variable.

The operating shafts 7a and 8a of the first detector 7 and the second detector 8, respectively, each have a sliding element attached thereto. The operating shaft 7a of the first detector 7 is engaged with the first supporting slit 5b of the movable member 5, and the operating shaft 8a of the second detector 8 is engaged with the second supporting slit 5c of the movable member 5.

Furthermore, an operating part 9 is mounted on the knob 5a of the movable member 5. The operating part 9 is slidable above a top plate 2c of the first cover 2 while being in contact with a protrusion 2d provided on the top plate 2c.

Accordingly, this prevents the movable member 5 from tilting when the operating part 9 is being slid. The movable member 5 can thus slide along the first cover 2 and the second cover 3 so as to properly achieve a smooth sliding operation.

The operation of the coordinate input device 1 according to the first embodiment of the present invention will now be described with reference to FIGS. 5 and 6. FIGS. 5 and 6 illustrate an example in which the operating part 9 is slid in a direction indicated by an arrow C by an operator so that the movable member 5 is similarly slid in the direction of the arrow C. This direction of the arrow C will be referred to as direction C.

In this example, the resilient member 6, i.e. the coil spring, stretches in the direction C, and the operating shaft 7a engaged with the first supporting slit 5b slides in the direction C. Thus, the resistance of the first detector 7 changes by a certain amount.

On the other hand, the resistance of the second detector 8 does not change since only the second supporting slit 5c moves in the direction C while the operating shaft 8a stays put.

A controller, which is not shown in the drawings, calculates the amount of change in resistance of the first detector 7 and the second detector 8 (zero in this case) so as to determine that the movable member 5 is slid in the direction C.

On the other hand, when the movable member 5 is slid in any other direction, the operating shaft 7a and the operating shaft 8a slide along the respective first supporting slit 5b and second supporting slit 5c by a certain distance. This changes the resistance of the respective first detector 7 and second detector 8 so that the sliding direction and the sliding distance of the movable member 5 can be determined.

Furthermore, when the operational force applied to the operating part 9 is released to stop the sliding operation of the movable member 5, the resilient member 6 tries to restore its initial state from the stretched state. Thus, the biasing force of the resilient member 6 allows the movable member 5 to return automatically to the initial position, i.e. the original position before the sliding operation.

The coordinate input device 1 of the first embodiment can be used in, for example, a video game unit. In such a case, a character displayed on a display screen, for example, can be moved in any direction in accordance with the sliding operation of the movable member 5.

Although the supporter 2a supporting the resilient member 6 is provided in the first cover 2 in the first embodiment, an alternative supporter (not shown in the drawings) may be provided on the inner surface 3a of the second cover 3 in a section where the recess 3b holding the first detector 7 and the second detector 8 is not provided.

In other words, a supporter for supporting the inner periphery of the resilient member 6 may be provided on either the first cover 2 or the second cover 3.

Second Embodiment

The coordinate input device 11 according to the second embodiment of the present invention will now be described with reference to FIGS. 7 and 8. Components equivalent to those in the first embodiment are indicated by the same reference numerals, and descriptions of those components will thus be omitted.

Referring to FIG. 7, the coordinate input device 11 of the second embodiment is provided with a housing 14 having a first cover 12 and a second cover 13 which face each other. The first cover 12 has a top plate 12a whose central portion is provided with an opening 12b having predetermined dimensions.

On the other hand, the second cover 13 has a circular supporter 13b protruding from the central portion of an inner surface 13a of the second cover 13 to a predetermined height. The supporter 13b supports the inner periphery of the resilient member 6.

Referring to FIGS. 7 and 8, the central portion of the supporter 13b is provided with a recess 13c in which the first detector 7 is embedded. The recess 13c extends longitudinally in a direction indicated by an arrow B.

The operating shaft 7a of the first detector 7 in the recess 13c is slidable in the x-axis direction, i.e. the direction of the arrow B.

Furthermore, the first cover 12 and the second cover 13 have a cavity 14a therebetween. The cavity 14a contains a movable member 15 which is circular in plan view and which has a larger diameter than the supporter 13b of the second cover 13.

The movable member 15 is provided with a knob 15a protruding upward from the center of the top surface of the movable member 15. The knob 15a is disposed in the opening 12b of the first cover 12. Moreover, the bottom surface of the movable member 15 is provided with a biased part 15b which protrudes downward to a predetermined height and has the same diameter as the circular supporter 13b of the second cover 13. The resilient member 6, which is supported by the supporter 13b, resiliently biases against the biased part 15b.

The central portion of the biased part 15b is provided ith a recess 15c in which the second detector 8 is embedded. The recess 15c extends longitudinally in a direction indicated by an arrow A.

Referring to FIG. 8, the second detector 8 mounted in the recess 15c crosses the first detector 7 mounted in the second cover 13. Thus, the total occupied area by the first detector 7 and the second detector 8 in the second embodiment is smaller than that of the first embodiment.

The operating shaft 7a and the operating shaft 8a of the respective first detector 7 and second detector 8 are disposed opposite to each other.

Furthermore, a space 16 having predetermined dimensions is formed between the first detector 7 and the biased part 15b of the movable member 15.

The opposing operating shafts 7a and 8a are positioned in the space 16 and are coupled together by a coupler 17 to form a single unit.

Accordingly, when the movable member 15 slides, both operating shafts 7a and 8a are simultaneously operated.

The operation of the coordinate input device 11 according to the second embodiment of the present invention will now be described with reference to FIGS. 9 and 10. An operating part, which is not shown in FIGS. 9 and 10, is mounted on the knob 15a. For example, by sliding the operating part in a direction indicated by an arrow C, the movable member 15 is similarly slid in the direction of the arrow C. This direction of the arrow C will be referred to as direction C.

When the movable member 15 is slid in the direction C, the second detector 8 similarly slides in the direction C. At the same time, the resilient member 6 supported by the supporter 13b stretches in the direction C, and the operating shaft 7a of the first detector 7 combined with the operating shaft 8a also slides in the direction C. Thus, the resistance of the first detector 7 changes by a certain amount.

On the other hand, the resistance of the second detector 8 does not change since the operating shaft 8a stays put while the second detector 8 slides with the movable member 15.

A controller, which is not shown in the drawings, calculates the amount of change in resistance of the first detector 7 and the second detector 8 so as to determine that the movable member 15 is slid in the direction C by a certain distance.

On the other hand, when the movable member 15 is slid in any other direction by a certain distance, the operating shaft 7a and the operating shaft 8a slide by the corresponding distance. This changes the resistance of the respective first detector 7 and the second detector 8, whereby the sliding direction and the sliding distance of the movable member 15 can be determined.

Similar to the first embodiment, when the operational force is released to stop the sliding operation of the movable member 15, the resilient member 6 tries to restore its initial state from the stretched state. Thus, the biasing force of the resilient member 6 allows the movable member 15 to return automatically to the initial position, i.e. the original position before the sliding operation, so that the supporter 13b and the biased part 15b become aligned with each other.

Third Embodiment

The coordinate input device 21 according to the third embodiment of the present invention will now be described with reference to FIGS. 11 and 12. Components equivalent to those in the first embodiment are indicated by the same reference numerals, and descriptions of those components will thus be omitted.

Referring to FIG. 11, the coordinate input device 21 of the third embodiment is provided with a housing 24 having a first cover 22 and a second cover 23 which face each other. The first cover 22 has a top plate 22a whose central portion is provided with an opening 22b having predetermined dimensions.

On the other hand, the central portion of an inner surface 23a of the second cover 23 is provided with a recess 23b which extends downward to a predetermined depth. The first cover 22 and the second cover 23 have a cavity 24a therebetween.

The cavity 24a contains a movable member 25 which is slidable in any direction while being in contact with the inner surface of the top plate 22a of the first cover 22.

The movable member 25 includes a biased part 25a which is circular in plan view and has a predetermined thickness, and a knob 25b protruding upward from the center of the biased part 25a.

The knob 25b is positioned within the opening 22b of the first cover 22.

The bottom surface of the circular biased part 25a of the movable member 25 faces a supporting member 26. The supporting member 26 has a predetermined thickness and has the same diameter as the biased part 25a. Moreover, the central portion of the supporting member 26 corresponding to the biased part 25a is provided with an engagement opening 26a having predetermined dimensions.

The outer peripheries of the movable member 25 and the supporting member 26 facing each other are surrounded by the resilient member 6, i.e. the coil spring.

The recess 23b below the supporting member 26 contains a detector 27 which includes a plurality of distortion sensors. The detector 27 detects the sliding direction and the sliding distance of the movable member 25.

The detector 27 includes a sensor substrate 27a formed of, for example, a ceramic that exhibits only a small deformation with respect to temperature change; and an operating shaft 27b which is attached to the center of the sensor substrate 27a with, for example, an adhesive, such that the sensor substrate 27a and the operating shaft 27b form a single unit.

Furthermore, the top surface or the bottom surface of the sensor substrate 27a is provided with distortion sensors (not shown in the drawings) formed of, for example, resistive elements. Such distortion sensors are formed by, for example, printing.

The outer periphery of the sensor substrate 27a is mounted on the bottom surface of the recess 23b of the second cover 23 with, for example, screws. Furthermore, the engagement opening 26a is engaged with the operating shaft 27b such that the supporting member 26 is supported by the detector 27. Moreover, a section of the bottom surface of the supporting member 26 near the outer periphery is supported by a height-regulating member 28.

Referring to FIG. 12, when the biasing force of the resilient member 6 is applied to the supporting member 26, the operating shaft 27b of the detector 27 is deflected by a certain angle, thus deflecting the sensor substrate 27a. Consequently, the distortion sensors detect the degree of distortion of the sensor substrate 27a so as to determine the sliding direction and the sliding distance of the movable member 25.

Accordingly, the coordinate input device 21 according to the third embodiment requires only one detector 27 and thus reduces the number of components as well as contributing to easier assembly.

Furthermore, the resilient member 6 described in each of the above embodiments is not limited to a coil spring, and may alternatively be, for example, a ring-shaped rubber belt.

As a further alternative, the second covers 3, 13, and 23 according to the first, second, and third embodiments, respectively, may each be provided with a switch circuit (not shown in the drawings). In such a case, the contact of the switch circuit may be switched on and off by pressing the corresponding movable member 5, 15, or 25.

Such coordinate input devices provided with a switch circuit allow various types of coordinate input due to the sliding operation and the pressing operation of the movable member 5, 15, or 25. This contributes to a more versatile coordinate input device.

As a further alternative, the first cover 2, 12, and 22 according to the first, second, and third embodiments, respectively, may each be provided with a typical switch circuit provided with a button switch (not shown in the drawings). In such a case, the button switch may be switched on and off by pressing the corresponding movable member 5, 15, or 25.

What is claimed is:

1. A coordinate input device comprising:
    a housing having a first cover and a second cover which face each other;
    a movable member which is disposed between the first cover and the second cover and which is slidable along the first cover and the second cover;
    an endless resilient member; and
    detectors for detecting a sliding direction and a sliding distance of the movable member, the detectors being disposed inside the housing,
    wherein one of the first cover and the second cover comprises a supporter for supporting an inner periphery of the resilient member,
    wherein the movable member in an initial position before a sliding operation is resiliently biased by the resilient member such that the movable member faces the supporter,
    wherein, when the movable member is slid in a certain direction from the initial position, the resilient member is stretched in the certain direction and the detectors detect the sliding direction and the sliding distance of the movable member,
    wherein, when the sliding operation of the movable member is finished, a resilient force of the resilient member stretched in the certain direction forces the movable member to return automatically to the initial position, and
    wherein a top plate of the first cover is provided with an opening such that the movable member is exposed through this opening, and the sliding operation of the movable member is performed through the opening;
    a cavity is provided between the top plate of the first cover and a surface of the second cover that are disposed facing each other;
    the movable member is in the form of a circular plate, the movable member being disposed within the cavity and being slidable in arbitrary directions;
    the supporter has a circular shape;
    the endless resilient member comprises a coil spring whose opposite ends are connected, the coil spring being disposed within the cavity with an initial state of the coil spring surrounding an outer periphery of the supporter;
    the detectors are slidable and are provided below the resilient member; and
    when the movable member at the initial position is slid in a certain direction, one side of the resilient member is stretched by the movable member in the certain direction along the surface of the second cover while the other side of the resilient member is retained by the supporter, the resilient member returning automatically to its initial position when the operation of the movable member is finished.

2. The coordinate input device according to claim 1, wherein the detectors are slidable variable-resistors and comprise a first detector for detecting the sliding of the movable member in an x-axis direction, and a second detector for detecting the sliding of the movable member in a y-axis direction, and
    wherein each of the first detector and the second detector is provided with an operating shaft, the resistance of each of the first detector and the second detector being changeable by sliding the corresponding operating shaft.

3. The coordinate input device according to claim 2, wherein the first detector and the second detector are disposed in the second cover such that the sliding direction of the operating shaft of the first detector is orthogonal to the sliding direction of the operating shaft of the second detector.

4. The coordinate input device according to claim 3, wherein the movable member further comprises a first supporting slit for supporting the operating shaft of the first detector, and a second supporting slit for supporting the operating shaft of the second detector, the first supporting slit extending in a y-axis direction such that the operating shaft of the first detector is slidable in the y-axis direction, the second supporting slit extending in an x-axis direction such that the operating shaft of the second detector is slidable in the x-axis direction.

5. The coordinate input device according to claim 1, wherein the movable member comprises a knob which protrudes outward through the first cover, and
    wherein an operating part for sliding the movable member is mounted on the knob, the operating part being slidable on a top surface of the first cover while being in contact with the top surface.

6. The coordinate input device according to claim 1, wherein one of the first cover and the second cover comprises a switch circuit, a contact of the switch circuit being switched on and off by pressing the movable member.

* * * * *